United States Patent [19]
Leder

[11] 3,772,843
[45] Nov. 20, 1973

[54] MULTIPANE STRUCTURE
[75] Inventor: Gustav Leder, Offenbach, Germany
[73] Assignee: USM Corporation, Boston, Mass.
[22] Filed: Feb. 25, 1972
[21] Appl. No.: 229,475

[30] Foreign Application Priority Data
Feb. 25, 1971  Germany .................. G 71 07 129.9

[52] U.S. Cl. .................................... 52/616, 52/624
[51] Int. Cl. ............................................. E06b 3/66
[58] Field of Search ........... 287/189.36 H, 189.36 J;
52/615, 616, 171, 172, 475, 624, 366, 398,
399, 397, 627, 628, 623; 264/249

[56] References Cited
UNITED STATES PATENTS
| | | | |
|---|---|---|---|
| 3,347,008 | 10/1967 | Strengholt | 52/398 |
| 2,793,887 | 5/1957 | Moore | 52/484 X |
| 3,458,618 | 7/1969 | Burns et al. | 264/249 |
| 3,461,545 | 8/1969 | Bush | 264/249 |
| 3,061,895 | 11/1962 | Kleinhams | 52/627 X |
| 2,173,664 | 9/1939 | Shutts | 52/616 |
| 2,057,730 | 10/1936 | Moderau | 52/397 |

FOREIGN PATENTS OR APPLICATIONS
| | | | |
|---|---|---|---|
| 583,027 | 9/1959 | Canada | 52/627 |
| 900,766 | 7/1962 | Great Britain | 52/398 |

*Primary Examiner*—Frank L. Abbott
*Assistant Examiner*—Carl D. Friedman
*Attorney*—Benjamin C. Pollard et al.

[57] ABSTRACT

Corners of edge bonded multipane structures are protected by angle members having holes through which edge sealing material extends as holding pegs.

3 Claims, 2 Drawing Figures

PATENTED NOV 20 1973 3,772,843

MULTIPANE STRUCTURE

FIELD OF THE INVENTION

This invention relates to edge-bonded multipane structures and particularly to multipane structures in which the panes are in spaced relation to provide insulation.

BACKGROUND OF THE INVENTION

Insulating glass for window units includes two or more sheets of glass enclosing a dead air space, the sheets being hermetically sealed around the edges. In a popular form of such glass, the sheets of glass are separated by spacers arranged inwardly of the edges of the glass, and sealing and bonding material is disposed in the channel formed between the outer surfaces of the spacers and the inner surfaces of the portions of the sheets of glass outwardly of the spacers. The edges of the glass are exposed, and, particularly at the corners, the glass has been easily chipped or cracked. In order to provide corner protections in these panes, it is known to arrange U-sections around the edges and corners. Such sections, however, have essential disadvantages as a corner protection. In the assembled state, a trough is formed on the under side of such an assembled pane, into which moisture can easily penetrate and lead in the course of time to the formation of a pool of water which attacks the packing material and leads to the penetration of water into the interior of the multipane-insulating glass. Furthermore, particularly high compressive stresses develop on the glass by point-contact of the U-section with the glass which is unavoidable because parallelism of the U-section and of the varying glass thicknesses can never be achieved accurately. Besides, the U-section consists of a material which is not simple to seal, particularly at the corners, and there is a great deal of waste, due to the constantly varying pane sizes.

BRIEF SUMMARY OF THE INVENTION

It is an object of the present invention to provide corner protection for multipane-insulating glass which is free from the above mentioned disadvantages and is particularly simple and inexpensive to produce and to apply to the bonding and sealing material at the edges of the panes.

To this end and in accordance with a feature of the present invention, a corner protection is provided in the form of perforated angles covering the corners and projecting over the outer edges of the panes, these angles being in contact with the bonding and sealing material, with portions of that material extending into the holes as holding pegs.

DETAILED DESCRIPTION OF THE INVENTION

Figure 1:
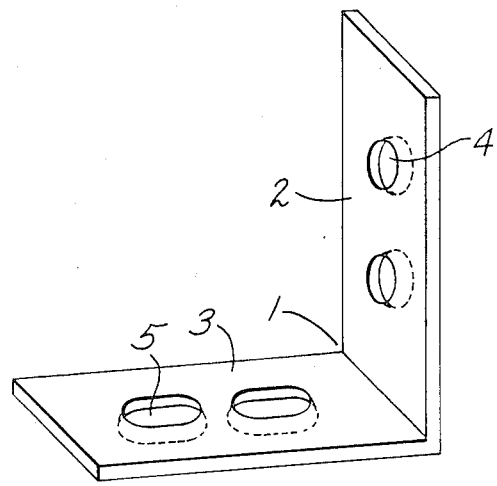
Figure 2:
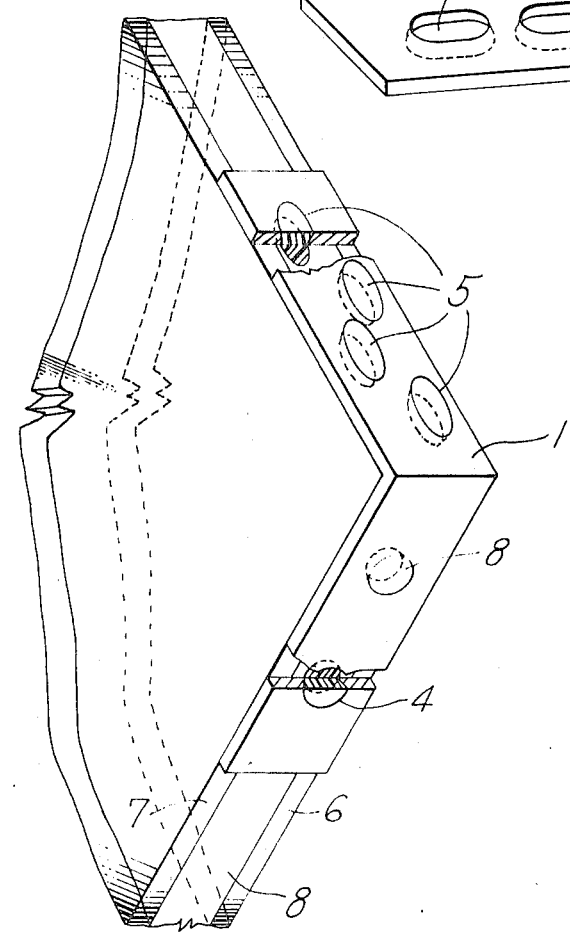

This invention will be described in connection with the attached drawings in which :

FIG. 1 is an angular view of one form of corner protecting angle element employed in the present invention; and FIG. 2 is a fractional angular view showing a molded corner portion of a multipane insulating glass with the corner protector angle element disposed to protect the corner.

The corner protector angle member 1 shown in FIG. 1 may be a piece of flat material of metal or plastic with the sides 2 and 3 disposed at an angle, usually a right angle, to each other. In the angle member 1, holes are provided in the sides, those holes 4 shown in side 2 being round and those shown in side 3 being oval. Preferably, the holes are wider at the outer side than at the inner side of the angle. It will be understood that these holes are shown only by way of illustration and that the number and type of holes may be varied depending on the stress to which they are subjected. Thus, a substantially greater number of small holes may be used up to the point where the sides have the appearance of a screen plate.

The multipane-insulating glass shown in FIG. 2 comprises the glass sheets 6 and 7 which are kept in spaced relation by suitable spacers (not shown) and with sealing and bonding material 8 filling the space between the inner surfaces of the glass sheet out to the edges of the glass sheet. The multipane glass assembly may be made by well-known procedures in which spacers are disposed between the glass panes 6 and 7, the assembly clamped together and sealing and bonding material e.g., polysulfide polymer or other hardenable compositions applied along the outer edges of the assembly by a suitable applicator so that the sealing and bonding material may be substantially flush with the outer edges of the panes 6 and 7. At the corners where the angle member 1 is to be applied, the initial application of the sealing and bonding material may be thicker so that the material 8 extends slightly beyond the edges of the glass sheets, or a small amount of material may be applied at the areas to which the angle member 1 is to be applied.

Application of the angle member 1 in protective relation to he corner of the multipane assembly merely involves pressing the angle member against the sealing and bonding material so that the material is forced into the holes 4 and 5 where, on solidification of the material, the portions within the holes form pegs firmly joining the angle member 1 to the corner of the multipane assembly.

The angle member 1 in this relation protects the corners of the multipane glass which are much more susceptible to damage then the side edges of the glass and it will be noted that there are no special precision requirements for the angle members since they are connected to the multipane assembly through the action of the sealing and bonding material provide a mechanical lock so that it is not necessary that a strong chemical bond be secured between the sealing and bonding material and the surfaces of the sides of the angle member. Additionally, due to the manner in which the angle members are joined, stresses applied to the corners are distributed so that even in the wedging step in mounting the multipane assembly, the angle members distribute the stress and avoid fracture of the glass. It is noted that the pegs of hardened sealing and bonding material in holes 1 are wider at the outer side than at the inner side of the angle and are particularly effective to resist displacmenet since the material in the wider portion serves as a head which cannot be drawn through the narrow portions of the holes.

It is not necessary that the edges of the angle member 1 extend out to the panes of the outer surfaces of the glass sheets and accordingly one size of the angle member 1 may be used over a range of thicknesses of the multipane-insulating glass. That is, it is only important that the corners of the multipane-insulation glass be protected, since the corner protection can maintain its full effect as long as the corners of the glass do not have to take the concentrated weight of the assembly as when the multipane glass is held in slanted position. When narrower angle members are used, it may be important to hold the assembly at a smaller angle than would be possible where the member 1 extends out to the plane of the outer surfaces of the glass sheets 6 and 7.

Having thus described my invention and what I claim as new and desire to secure as Letters Patent of the United States is:

1. A multipane-insulating glazing unit comprising an assembly of spaced parallel panes of glass, sealing and bonding material filling the marginal spaces along the outer edge of said assembly between inner surfaces of said panes and solidified in bonding relation to said inner surfaces of said panes to hold the panes bonded together in said assembly, a perforated angle member disposed at a corner of said panes with the sides of said angle member extending adjacent edge portions of said panes, portions of said solidified bonding and sealing material extending beyond the outer edges of said panes and into perforations in said angle member in portions of said assembly adjacent corners of said panes, said material in said perforations constituting solid pegs integral with the solidified material in said marginal spaces holding said angle member in protective relation to said corner of the panes.

2. Multipane-insulating glass as defined in claim 1 in which the dimensions of perforations in said angle member are greater at the outside of said angle member then at the surfaces adjacent said sheets of glass.

3. Multipane-insulating glass as defined in claim 2 in which the sides of said angle members extend at least to the wedging points to distribute stresses encountered in installation.

* * * * *